ns
OR 3,655,269

United States T 3105 D
Heilmeier

[15] 3,655,269
[45] Apr. 11, 1972

[54] LIQUID CRYSTAL DISPLAY ASSEMBLY HAVING INDEPENDENT CONTRAST AND SPEED OF RESPONSE CONTROLS

[72] Inventor: George H. Heilmeier, Philadelphia, Pa.
[73] Assignee: RCA Corporation
[22] Filed: Jan. 25, 1971
[21] Appl. No.: 109,688

[52] U.S. Cl. .............................. 350/160, 178/7.3, 340/324
[51] Int. Cl. .................................................. G02f 1/28
[58] Field of Search ............... 340/166, 324; 178/7.5, 7.3; 350/160

[56] References Cited

UNITED STATES PATENTS 3,322,485  5/1967  Williams ........................... 350/160

3,532,813  10/1970  Lechner ............................. 178/7.3

OTHER PUBLICATIONS

Molecular Crystals, 1966 Vol. 2 pp. 167–188 Muller " Effects of Electric Fields on Cholesterol Nonanoate Liquid crystals."

*Primary Examiner*—Donald J. Yusko
*Attorney*—Eugene M. Whitacre

[57] ABSTRACT

A liquid crystal display assembly offering control of the speed of response of the exhibited electro-optical effect by varying the amplitude of the applied energizing signal and further offering independent control of the contrast by varying the frequency of that signal above a predetermined value.

5 Claims, 5 Drawing Figures

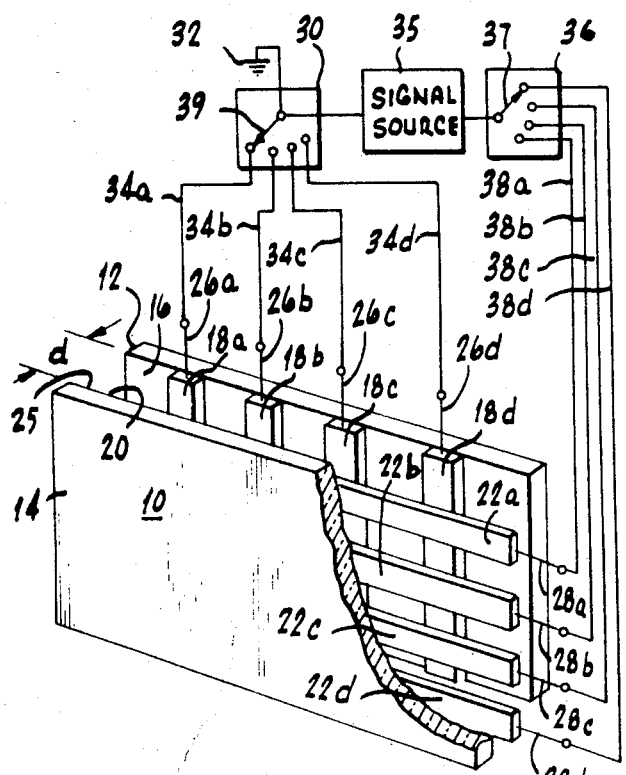
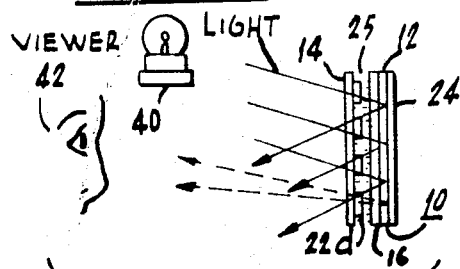
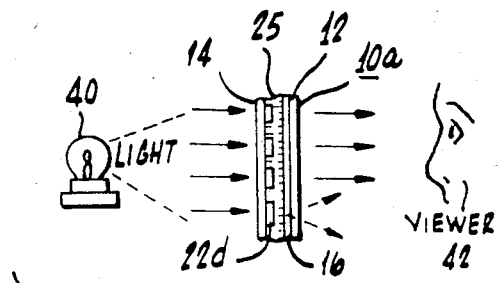
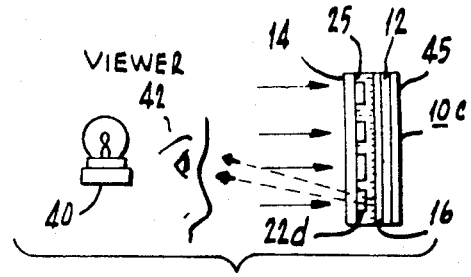
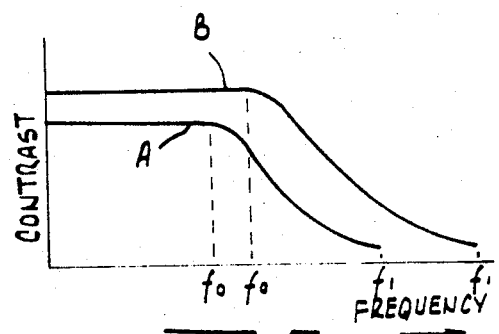
INVENTOR
GEORGE H. HEILMEIER
BY Charles Brodsky
ATTORNEY

LIQUID CRYSTAL DISPLAY ASSEMBLY HAVING INDEPENDENT CONTRAST AND SPEED OF RESPONSE CONTROLS

The present invention relates to liquid crystal display assemblies offering independent control of the contrast and speed of response of the exhibited electro-optical effect. As is known, this electro-optical effect may be employed in transmissive, reflective or absorptive type flat panel displays, in light shutters, and in other applications.

Display assemblies of this type by and large include a thin layer of nematic liquid crystal material between two planar elements. One of these elements is transparent in nature while the other may be transparent, reflective or absorptive depending upon the desired mode of operation of the assembly. Generally, with no electric field applied to the nematic crystal material, the material is relatively transparent to light. When an electric field is applied to the crystal material above a predetermined threshold, however, it undergoes a change in appearance in the region of the field. More particularly, the presence of the electric field creates ions in the material which travel throughout the layer. These travelling ions produce an effective turbulence that causes a dynamic scattering of light, and gives the liquid crystal an opalescence, i.e., a milky white appearance.

In order to effectively use the electro-optical effect exhibited by liquid crystals in a television type display, it will be apparent that both an adequate contrast range and sufficient speed of response must be provided by the material employed. Since the contrast depends upon the degree of turbidity in the crystal material, and since the degree of turbidity and the speed of response both depend, and in the same manner, upon the amplitude of the signal establishing the applied electric field, it may very well be that the signal amplitude required to produce a display of less than maximum turbidity or contrast will, at the same time, result in a speed of response which is too slow for acceptable video applications.

It will be understood that as used herein, the term "contrast" refers to the ratio of the crystal material turbidity or scattering of light when the electric field is applied ("ON" condition) to that when no field is applied ("OFF" condition). In a reflective mode of operation, the contrast corresponds to the ratio of white-to-black in the electro-optical display.

As will become clear, according to the teachings of the present invention, control of the speed of response, i.e., over the rise time of the exhibited electro-optical effect, can be had by varying the amplitude of the applied energizing signal, while control of the contrast can be independently had by varying the frequency of that signal.

The novel features which are considered to be characteristic of the present invention are set forth with particularity in the appended claims. The invention itself, however, both as to its organization and method of operation, and as to the advantages thereof, will best be understood by reference to the accompanying drawings in which:

FIG. 1 is an embodiment of a liquid crystal display assembly employing the teachings of the invention for a reflective mode of operation;

FIG. 2 representatively shows the use of the liquid crystal display embodiment of FIG. 1 in such a reflective mode;

FIG. 3 is a graph showing the relative contrast exhibited by a liquid crystal display as a function of applied signal frequency;

FIG. 4 representatively shows the use of a modified liquid crystal display embodiment in a transmissive mode of operation; and FIG. 5 representatively shows the use of a further modified liquid crystal display embodiment in an absorptive mode of operation.

In FIG. 1, the liquid crystal display assembly includes a crossed grid optical display device 10 having parallel back and front transparent glass support plates 12 and 14 of between 5 to 30 microns separation. The back plate 12 supports, on its inner face 16, a first array of parallel spaced transparent conductive electrode strips 18a, 18b, 18c, 18d, etc., while the front plate 14 supports, on its inner face 20, a second array of parallel spaced transparent conductive electrode strips 22a, 22b, 22c, 22d, etc. As shown, the front electrode strips 22a, 22b, 22c, 22d, etc., are positioned so that their longitudinal directions are substantially perpendicular to the like directions of the back electrode strips 18a, 18b, 18c, 18d, etc. Interspersed between the back and front plates 12 and 14 is a thin layer of liquid crystal material 25, anisylidene-paraaminophenylacetate (APAPA) for example. In this display assembly, the back plate 12 is made reflective, in one manner by coating its outer face 24 with a material such as an evaporated film of nickel or aluminum.

The optical device 10 further includes connections 26a – 26d and 28a – 28d for applying a signal voltage of controllable amplitude and frequency to the conductive back electrodes 18a, 18b, 18c and 18d and to the conductive front electrodes 22a, 22b, 22c and 22d. As used hereinafter, such connections and/or such conductive electrodes comprise a means for applying the electric field or voltage to the liquid crystal layer 25.

The assembly of FIG. 1 additionally shows apparatus for operating the display device 10. A back strip commutator switch 30 is included, having its common contact connected to one side of a signal source of variable amplitude and frequency 35 and to ground 32. A plurality of commutator contacts of the switch 30 are connected to the back strip connections 26a – 26d through leads 34a – 34d. Also, a front strip commutator switch 36 is provided, having a plurality of contacts connected to the front strip connections 28a – 28d via leads 38a – 38d and a common contact connected to the signal source 35.

In the reflective mode of operation illustrated in FIG. 2, a light source 40 and a viewer 42 are both positioned on the transparent plate side of the display assembly. The light source 40 preferably produces a collimated beam at such an angle that with no voltage applied across the electrodes of the optical device 10, the light reflected from the reflective coating face 24 does not strike the viewer 42. When a voltage is applied by the source 35 and its associated connectors between a back electrode strip and a front electrode strip of sufficient amplitude to cause current flow in the crystal material volume defined by the intersection of the energized electrode strips, a turbulence in the crystal layer 25 is caused and gives rise to a scattering of the light which is incident on that portion of the display device 10. Some of this scattered light is observed by the viewer 42 and this region of his field of view will become brighter than the remaining plate area. The threshold voltage required to obtain this effect is generally in the range of $0.5 \times 10^4$ to $1.0 \times 10^4$ volts per centimeter of film thickness.

As is known, a plurality of predetermined regions can be brightened by sequentially energizing more than one electrode strip from each back and front set. Scanning techniques known to the mural television art may be utilized to sequentially and cyclically energize the conductive strips and to modulate the amplitude of the signal source. In this manner, various types of information may be optically displayed. Furthermore, by having a large number of closely-spaced electrode strips on each plate--1 mil wide and ½ mil apart, for example--a picture can be displayed on the optical device 10. Furthermore, the percent of light scattered, and hence the degree of brightening for each element, can be modulated by controlling the amplitude of the applied signal voltage above the threshold, thereby affording a gray scale.

However, it has been found that when modulating this amplitude so as to provide a moderate-to-low amount of brightening (i.e., less than maximum contrast), the speed of response of the exhibited electro-optical effect may well be too slow for most video applications. It has also been found, though, that for a given amplitude signal above the threshold, the contrast will vary as a function of frequency in the low audio range. That is, given for example that amplitude signal which will produce maximum brightening, the contrast can be changed to afford a gray scale by varying the signal frequency. Since the speed of response remains essentially dependent only upon the amplitude of the energizing signal, an independent control of the exhibited contrast can be had.

To be more specific, it has been observed that the contrast varies as a function of signal frequency in the manner illustrated by the curves of FIG. 3. Curve A represents the contrast variation for a signal amplitude of 40 volts rms while Curve B represents the variation with a 60 volt rms signal. The frequency $f_o$ at which the contrast begins to fall off as a function of frequency is dependent upon the amplitude of the energizing signal, by the thickness of the liquid crystal cell and by the inverse of the crystal material resistivity. With the aforementioned APAPA mixture of $6.4 \times 10^8$ ohm-cm resistivity at 25° C, for example, $f_o$ was measured for a ½ mil thick cell to be approximately 700 hertz at the 40 volt energizing level (Curve A) and approximately 1 kilohertz at the 60 volt rms level (Curve B). The frequency $f_1$ at which the contrast approached a minimum for the applied signal voltage was measured to be approximately 2 kilohertz for the 40 volt signal and 2.5 kilohertz for the 60 volt case.

These observations are employed in the liquid crystal display assembly of FIG. 1 by utilizing for the signal source 35, one of controllable frequency as well as one of variable amplitude. Selecting a signal amplitude of a value such that an optimum speed of electro-optical response will result will then permit independent contrast adjustment by proper frequency selection to provide an adequate gray scale for video applications. Such a signal source may comprise a frequency modulated oscillator, for example, wherein applied scanning signals may be employed to vary bias voltages so as to control the frequency of oscillation thereof.

In the above optical display assembly, operation is achieved by modulation of light reflection as illustrated in FIG. 2. Alternatively, operation can be achieved by modulation of light transmission or light absorption. In a transmissive mode of operation, a display device 10a as illustrated in FIG. 4 is used. The device 10a differs from the device 10 in that the reflective coating 24 is omitted from the transparent back plate 12. The light source 40 is positioned on one side of the device 10a so that light is directed through the device in a direction normal to the major faces of the plates 12 and 14. At less than an applied threshold field, the viewer 42 on the opposite side of the device 10a sees the entire plate area as uniformly bright. When a voltage of sufficient amplitude is applied between a back electrode strip and a front electrode strip to cause turbulence in the film and a scattering of light incident on the device, the region of the observer's field of view becomes darker. By varying the frequency of the applied energizing signal above the aforementioned $f_o$ frequency, the darkness of the field of view is made lighter.

In the absorptive mode of operation, the device 10c, as illustrated in FIG. 5, employs a back plate 12 coated with a layer of dark material 45 so that light passing through the transparent front plate 14 and the nematic liquid crystal layer 25 is absorbed at the plate 12. (Alternatively, the back plate 12 may itself be of dark colored composition.) The light source 40 and the viewer 42 are both disposed on the transparent plate side of the optical device 10c, with essentially all the light being absorbed by the dark plate 12 and with only a small quantity being reflected to the viewer when the voltage applied across an electrode of the group 18a – 18d and an electrode of the group 22a – 22d is below the threshold level. When a voltage above the threshold is applied across any of the electrode pairs, some of the light at their intersection is caused to be reflected by the liquid crystal layer 25 and appears as a bright area to the viewer. By varying the frequency of the applied signal voltage above the $f_o$ value according to the invention, however, the brightness of this area can be reduced. Since about 90 percent of the light is forward scattered by the turbulent liquid crystal layer rather than back scattered, this mode of operation is the least efficient in that most of the light continues in the same general direction as prior to scattering and is absorbed on the dark surface. It will be noted that the forward scattered light is reflected back to the viewer in the first described mode of operation, and is effective to give a brighter image.

What is claimed is:

1. A liquid crystal display assembly comprising a layer of nematic liquid crystal material and means for applying an electrical signal of predetermined amplitude and frequency to said crystal material, said predetermined amplitude being selected to establish the speed of response of the dynamic light scattering electro-optical effect exhibited thereby, and said predetermined frequency being selected above a threshold to independently control the contrast of the resulting display by controlling the motion and turbidity of ions within said nematic material to provide a modification of said dynamic light scattering effect.

2. The liquid crystal display assembly as described in claim 1 wherein means are included for supporting said liquid crystal layer comprising essentially parallel support plates between which said layer is contained, at least one of said support plates being transparent and having a transparent conductive coating on at least one side thereof, and wherein said means for applying said electrical signal of predetermined amplitude and frequency to said crystal material includes said transparent conductive coating.

3. The liquid crystal display assembly as described in claim 1 wherein said independent control over the contrast is initiated at a signal frequency which is dependent upon the amplitude of the applied electrical signal which establishes said speed of response.

4. The liquid crystal display assembly as described in claim 3 wherein said signal frequency at which independent control over the contrast of the exhibited electro-optical effect is initiated is also dependent upon the resistivity of the nematic liquid crystal material.

5. The liquid crystal display assembly as described in claim 3 wherein said signal frequency at which independent control over the contrast of the exhibited electro-optical effect is initiated is also dependent upon the thickness of the nematic liquid crystal material.

* * * * *

UNITED STATES PATENT OFFICE
CERTIFICATE OF CORRECTION

Patent No. 3,655,269          Dated April 11, 1972

Inventor(s) George H. Heilmeier

It is certified that error appears in the above-identified patent and that said Letters Patent are hereby corrected as shown below:

Column 1, Line 4 - insert -- This application is a continuation of Serial No. 749,058, filed July 31, 1968, now abandoned. --

Column 3, Line 6 - after "of" insert -- energizing --.

Signed and sealed this 26th day of September 1972.

(SEAL)
Attest:

EDWARD M. FLETCHER, JR.          ROBERT GOTTSCHALK
Attesting Officer                Commissioner of Patents